(12) United States Patent
Devins et al.

(10) Patent No.: US 7,849,362 B2
(45) Date of Patent: Dec. 7, 2010

(54) METHOD AND SYSTEM OF COHERENT DESIGN VERIFICATION OF INTER-CLUSTER INTERACTIONS

(75) Inventors: Robert J. Devins, Essex Junction, VT (US); David W. Milton, Underhill, VT (US); Pascal A. Nsame, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 11/275,092

(22) Filed: Dec. 9, 2005

(65) Prior Publication Data

US 2007/0168733 A1 Jul. 19, 2007

(51) Int. Cl.
*G06F 11/00* (2006.01)
(52) U.S. Cl. .............................. 714/25; 714/27; 714/31; 714/33; 703/14; 703/21; 711/114
(58) Field of Classification Search ................... 714/33, 714/25, 27, 31; 703/17, 14, 21; 711/114
See application file for complete search history.

(56) References Cited

U.S. PATENT DOCUMENTS

| | | | |
|---|---|---|---|
| 3,786,430 A | 1/1974 | Hajdu et al. | |
| 4,397,021 A * | 8/1983 | Lloyd et al. | 714/33 |
| 4,583,222 A | 4/1986 | Fossum et al. | |
| 4,870,704 A * | 9/1989 | Matelan et al. | 710/120 |
| 4,873,656 A | 10/1989 | Catlin | |
| 4,959,781 A | 9/1990 | Rubinstein et al. | |
| 5,097,412 A | 3/1992 | Orimo et al. | |
| 5,115,499 A * | 5/1992 | Stiffler et al. | 711/148 |
| 5,123,094 A * | 6/1992 | MacDougall | 712/30 |
| 5,167,023 A | 11/1992 | Nicolas et al. | |
| 5,301,302 A | 4/1994 | Blackard et al. | |
| 5,371,883 A * | 12/1994 | Gross et al. | 714/38 |
| 5,446,841 A * | 8/1995 | Kitano et al. | 709/213 |
| 5,446,865 A * | 8/1995 | Corcoran et al. | 703/26 |
| 5,488,713 A | 1/1996 | Norton et al. | |
| 5,590,338 A * | 12/1996 | Parks et al. | 710/269 |
| 5,805,867 A | 9/1998 | Kodaira | |
| 5,862,366 A | 1/1999 | Schmidt et al. | |

(Continued)

FOREIGN PATENT DOCUMENTS

JP 62157961 7/1987

(Continued)

OTHER PUBLICATIONS

Tenebaum, Andrew S. Structured Computer Organization. Englewood Cliffs, NJ: Prentice-Hall, Inc., 1984.*

(Continued)

*Primary Examiner*—Robert Beausoliel
*Assistant Examiner*—Joshua P Lottich
(74) *Attorney, Agent, or Firm*—Richard Kotulak; Roberts Mlotkowski Safran & Cole, P.C.

(57) ABSTRACT

A method and system comprises creating a test case that is dependent upon known sequences and executing the test case on an originating processor until it reaches a known point. The method further includes executing the test case on a different processor to perform an action and informing the originating processor that the action was taken. The action is verified as being occurred with the originating processor.

19 Claims, 4 Drawing Sheets

U.S. PATENT DOCUMENTS

| | | | |
|---|---|---|---|
| 5,894,573 A * | 4/1999 | Fukasawa et al. | 719/310 |
| 6,014,512 A | 1/2000 | Mohamed et al. | |
| 6,029,205 A * | 2/2000 | Alferness et al. | 719/310 |
| 6,115,763 A | 9/2000 | Douskey et al. | |
| 6,131,079 A * | 10/2000 | Smith | 703/13 |
| 6,199,031 B1 | 3/2001 | Challier et al. | |
| 6,208,954 B1 | 3/2001 | Houtchens | |
| 6,269,319 B1 * | 7/2001 | Neisch et al. | 702/118 |
| 6,279,050 B1 * | 8/2001 | Chilton et al. | 710/20 |
| 6,298,452 B1 * | 10/2001 | Hill | 714/28 |
| 6,321,181 B1 | 11/2001 | Havens | |
| 6,336,088 B1 * | 1/2002 | Bauman et al. | 703/15 |
| 6,427,224 B1 * | 7/2002 | Devins et al. | 716/4 |
| 6,467,082 B1 | 10/2002 | D'Arcy et al. | |
| 6,487,699 B1 * | 11/2002 | Devins et al. | 716/4 |
| 6,510,531 B1 | 1/2003 | Gibbons | |
| 6,539,522 B1 * | 3/2003 | Devins et al. | 716/5 |
| 6,567,934 B1 * | 5/2003 | Yen et al. | 714/33 |
| 6,606,676 B1 | 8/2003 | Deshpande et al. | |
| 6,615,167 B1 * | 9/2003 | Devins et al. | 703/28 |
| 6,625,679 B1 | 9/2003 | Morrison et al. | |
| 6,633,940 B1 | 10/2003 | Alasti et al. | |
| 6,658,633 B2 * | 12/2003 | Devins et al. | 716/5 |
| 6,718,294 B1 | 4/2004 | Bortfeld | |
| 6,732,338 B2 | 5/2004 | Crouse et al. | |
| 6,851,075 B2 * | 2/2005 | Ur et al. | 714/36 |
| 6,859,892 B2 * | 2/2005 | Bolding et al. | 714/34 |
| 6,898,735 B2 * | 5/2005 | Tuttle | 714/33 |
| 6,904,398 B1 | 6/2005 | Panesar | |
| 6,928,539 B2 * | 8/2005 | Brassac et al. | 713/1 |
| 6,952,795 B2 * | 10/2005 | O'Gorman et al. | 714/33 |
| 7,231,616 B1 * | 6/2007 | Mohanty et al. | 716/4 |
| 7,266,490 B2 * | 9/2007 | Zeidman | 703/27 |
| 7,313,731 B2 * | 12/2007 | Smith et al. | 714/34 |
| 7,319,947 B1 * | 1/2008 | Khaira et al. | 703/17 |
| 7,418,557 B2 * | 8/2008 | Blinick et al. | 711/141 |
| 7,525,958 B2 * | 4/2009 | Kumar et al. | 370/386 |
| 2001/0044913 A1 * | 11/2001 | Brassac et al. | 714/33 |
| 2002/0083387 A1 | 6/2002 | Miner et al. | |
| 2003/0046668 A1 * | 3/2003 | Bowen | 717/131 |
| 2003/0131283 A1 * | 7/2003 | Ur et al. | 714/36 |
| 2003/0149946 A1 * | 8/2003 | Devins et al. | 716/4 |
| 2003/0171907 A1 * | 9/2003 | Gal-On et al. | 703/14 |
| 2003/0188278 A1 * | 10/2003 | Carrie | 716/4 |
| 2003/0200073 A1 * | 10/2003 | Rich et al. | 703/17 |
| 2003/0208351 A1 * | 11/2003 | Hartman et al. | 703/22 |
| 2004/0010401 A1 * | 1/2004 | Davis et al. | 703/14 |
| 2004/0034750 A1 * | 2/2004 | Horn | 711/156 |
| 2004/0088150 A1 * | 5/2004 | Gay | 703/14 |
| 2004/0093536 A1 * | 5/2004 | Weller | 714/33 |
| 2004/0133409 A1 * | 7/2004 | Mukherjee et al. | 703/14 |
| 2004/0139272 A1 * | 7/2004 | Rodriguez-Rivera et al. | 711/100 |
| 2004/0193397 A1 * | 9/2004 | Lumb et al. | 703/24 |
| 2004/0210721 A1 * | 10/2004 | Detjens et al. | 711/141 |
| 2005/0060133 A1 * | 3/2005 | Schuppe | 703/22 |
| 2005/0154573 A1 * | 7/2005 | Maly et al. | 703/21 |
| 2005/0226235 A1 * | 10/2005 | Kumar et al. | 370/386 |
| 2006/0130041 A1 * | 6/2006 | Pramanick et al. | 717/168 |
| 2006/0190697 A1 * | 8/2006 | Grant | 711/170 |
| 2006/0229861 A1 * | 10/2006 | Tatsuoka et al. | 703/21 |
| 2006/0259661 A1 * | 11/2006 | Feng et al. | 710/39 |

FOREIGN PATENT DOCUMENTS

| | | |
|---|---|---|
| JP | 04-148461 A | 5/1992 |
| JP | 9073435 | 3/1997 |
| JP | 09-325946 A | 12/1997 |

OTHER PUBLICATIONS

*OS and Compiler Considerations in the Design of the IA-64 Architecture*—Zahir, R. et al.; 2000.
*On Processes and Interrupts*—Gerrity, GW.; 1981.
*Synchronizing Processors with Memory-Content-Generated Interrupts*—Hill, JC.; 1973.
*A Scalable and Flexible Data Synchronization Scheme for Embedded HW-SW Shared-Memory Systems*—Gangwal, OP. et al.; 2001.

* cited by examiner

DISTRIBUTED TESTCASE EMPLOYING USER DEFINED SIGNALS

US 7,849,362 B2

METHOD AND SYSTEM OF COHERENT DESIGN VERIFICATION OF INTER-CLUSTER INTERACTIONS

FIELD OF THE INVENTION

The invention relates to a method and system of testing and/or verifying designs, and more particularly to a method and system of system-on-chip (SoC) design verification of inter-cluster interactions using simulation processes.

BACKGROUND DESCRIPTION

Present-day integrated circuit (IC) chips have advanced significantly in both complexity and sophistication. For example, in early generation chip designs, a chip might embody relatively simple electronic logic blocks effected by interconnections between logic gates; whereas, newer generation chips include designs having combinations of complex, modularized IC designs often called "cores", which together constitute an entire SoC. These newer generation IC designs significantly increase the overall functionality and performance characteristics of the chip, itself, by for example, having the ability to include smaller feature sizes and thus increasing the amount of circuitry which can be built on a single chip. But, this comes at a cost: longer design and verification times which, in turn, translate into added development and manufacturing costs.

To design such complex IC chips, the IC chip development includes a design phase and a verification phase, of which the latter is critical to the determination of the workability and hence functionality of the chip, itself. For example, it is in the verification phase that a determination is made as to whether a design works as expected.

The verification phase has moved toward a software simulation approach to avoid the costs of first implementing designs in hardware to verify the workability of such designs. However, multiprocessor and multicore designs can lead to very large simulation models due to the fact that the entire design and testbench must be constructed for every simulation. Even when using modern simulation tools, simulation load and execution time, as well as build time can become cost and time prohibitive. This is especially true in complex design cases with inter-processor clusters since a complete gate level representation of the design must be constructed and loaded into the simulation for each processor.

By way of illustration, in verifying a design, a simulator (e.g., specialized software whose functions include accepting software written in a hardware description language (HDL) such as Verilog or VHDL) models a circuit design (e.g., a core) in order to simulate a response of the design. This response is applied by a test case to determine whether the design functions as expected. However, to achieve acceptably bug-free designs, the verification software must load the complete design into existing tools in order to satisfactorily verify the design, i.e., applying a number of test cases to fully exercise the design in simulation.

As the chip design becomes more complex in both individual cores and the interactions between cores, the verification tends to require an even more inordinate amount of time and computing resources, largely due to the modeling and verification of the interaction of functions associated with the entire design. That is, for example, the verification process becomes exponentially longer due to the need to load and exercise an entire test design for testing only one function or an interaction between two or more functions. This verification process becomes even more complicated for verification of multi-processor cores, which interact with one another, since no known technologies exist which can communicate with one another to verify the interactions between multi-processor cores. These inefficiencies in current verification methodologies exacerbate time pressures and increase, significantly, the time-to-market, a key factor for developers and marketers of IC chips in being competitive in business.

SUMMARY OF THE INVENTION

In a first aspect of the invention, a method includes creating a test case that is dependent upon known sequences and executing the test case on an originating processor until it reaches a known point. The method further includes executing the test case on a different processor to perform an action and informing the originating processor that the action was taken. The action is verified as being occurred with the originating processor.

In another aspect of the invention, the method includes providing a signal to access and obtain shared information obtained from an execution of a distributed test case on a first processor of at least two processors such that tasks completed by the first processor are communicated to a second processor of the at least two processors during simultaneous execution of a distributed test case. The method further includes executing a test case of the distributed test case on the second processor using the shared information, upon receipt of the signal, to verify a design. The signal provides control and synchronization of the distributed test case in a multi-processor application.

In another aspect of the invention, a system includes a mechanism which is structured and adapted to allow simultaneous execution of a distributed test case, running on different processors, and to communicate a state of each test case of the distributed test case. The system further includes a module which provides a handshaking protocol to signal when to check for a result of the test case on an alternate of the different processors, and to respond with the results of the check.

In further aspects of the invention, a computer program product comprising a computer useable medium including a computer readable program is provided. The computer readable program when executed on a computer causes the computer to implement the steps of the invention.

DETAILED DESCRIPTION OF EMBODIMENTS OF THE INVENTION

The invention relates to a method and system of system-on-chip (SoC) design verification of a multiprocessor program using improved simulation processes. In an embodiment of the invention, the system and method implements a distributed test case running simultaneously on multiple processors which are capable of communicating the respective state of each test case (e.g., of a distributed test case) in order to validate or verify functions across multiprocessor programs. More specifically, the method and system provides controls and synchronization of the distributed test case in a multi-processor TOS (test operating system) application. Thus, in embodiments, the system and method of the invention allows tasks within multiple TOS applications to communicate during simultaneous execution (e.g., using a shared-message memory and a TestnSet hardware) to verify designs of multiprocessors.

In one implementation, the test application includes one or more of the following architectural elements:

- A coherent structure for shared message memory (SMM) to support inter-TOS protocols (using, for example, MP TOS API function calls);
- A semaphore mechanism communicating executables (e.g., TOS executables) during atomic operations on shared external simulation models (e.g., EMU, SMM and TimebaseR™);
- A mechanism for each TOS application to poll command queue during parallel test case schedules during slow and fast mode operation; and/or
- A failure recovery mechanism.

By using these architectural features, the interactions between multi-processor cores can be verified, which leads to proven robust designs and significantly faster time-to-market turnaround.

Figure 1:
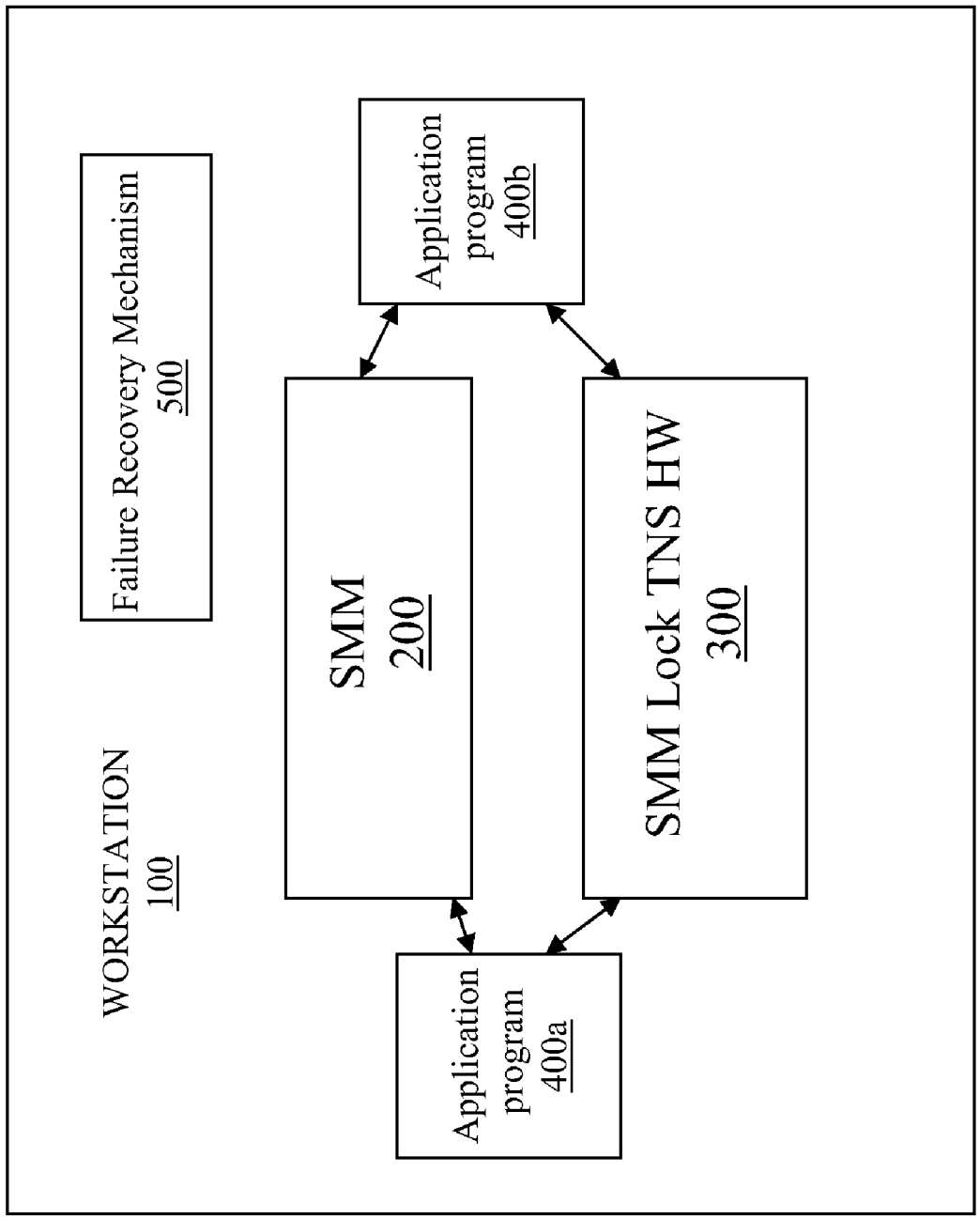
FIG. 1 is a block diagram describing an embodiment in accordance with the invention.

FIG. 1 shows a block diagram implementing the features of the invention. In particular, FIG. 1 shows one or more workstations denoted as reference numeral 100. The one or workstations 100 include a memory, one or more processors and other well-known components.

In one implementation of the invention, the one or more workstations 100 include a shared message memory (SMM) 200 to support inter-TOS protocols. The one or more workstations 100 additionally include a shared memory lock Test and Set Hardware (SMM Lock TNS HW) 300, one or more program applications, 400a and 400b, e.g., running on different processors, and a failure recovery mechanism 500. The program applications 400a, 400b may be any conventional program application such as, for example, AutoTOS™, which run test cases for verification of a design on different processors.

In one specific example, AutoTOS™ (or ADF (Application Definition File) (where software resources are specified)) may be used to compile user specified parameters (e.g., resources) in order to generate a specific test to verify. As should be known to those of skill in the art, AutoTOS™ is a compiler tool used to automate test and generation processes. In one implementation, the AutoTOS™ can be used to generate test cases implementing a template, as should be understood by those of ordinary skill in the art.

Still referring to FIG. 1, in the embodiment shown, the TOS applications run "alternate aware" (or distributed) test cases at the same time on separate processors. To implement the distributed test cases, in one embodiment, signals can be transmitted between the TOS applications, via a SYSTEM_CALLBACK function generated by autoTOS. By using the SYSTEM_CALLBACK function, the applications 400a, 400b can transfer information with one another via the SMM 200, which is initiated by a handshake by the SMM Lock TNS HW 300, as discussed more fully below.

By way of one illustration, the SMM Lock TNS HW 300 implements a handshake (e.g., signal) between at least two processors, which provides a coherent structure for the SMM to support the inter-TOS protocols of the at least two processors. In one example, the handshake (e.g., handshaking protocol) can signal to the TOS applications when to check for a result in the alternate TOS application, and to respond with the results of the check. In this manner, the handshake can be used to initiate the inter-TOS communications, while locking and unlocking read and write operations. This allows, in part, the simultaneously running of test cases and their interaction with one another. In this way, the function of the test cases can be "distributed" amongst different processors. In embodiments, the SMM Lock TNS HW 300 assures that when a lock is set from one processor, all other processors in the system see and properly identify the lock. An implementation of the handshake may include, for example,

```
Void EMU_Spin_Lock (void)
{
Unsigned char temp8=0x80;
/* obtain the lock, when valid */
If (lock_state != 2) return;
While (temp8 & 0x80) == 0x80)
    READ_MIO8_NOTRACE (KERNEL_TESTNSET + (TOSID*8) +
EMULOCK, &temp8);
Return;
}
```

("READ_MIO8_NOTRACE (KERNEL_TESTNSET+(TOSID*8)+EMULOCK, &temp8" is a reusable API, which may be obtained from a library.)

Still referring to FIG. 1, the SMM 200 may be an SRAM of bin files, implemented to share information of the TOS applications of multiple processors. In implementations, the SMM 200 provides a semaphore mechanism for all communicating TOS executables during atomic operations on shared external simulation models (EMU, SMM and TimebaseR™). That is, in implementations, the SMM 200 provides for communication between two programs sharing the same data during read/write operations. As should be known, atomic operations permit read/write operations simultaneously during one cycle such that no other program running in parallel can execute between the read/write operations.

In the manner discussed above, a test case can be created which is dependent upon known sequences. The test case can then be executed on different processors, in the required sequence, as a distributed test case. For example, the test case on an originating processor can be run until it reaches a known point. The test case can then be run on a different processor to perform an action, taking information obtained from the originating processor. The originating process may become aware of the action taken and verify that such action was taken.

Figure 2:
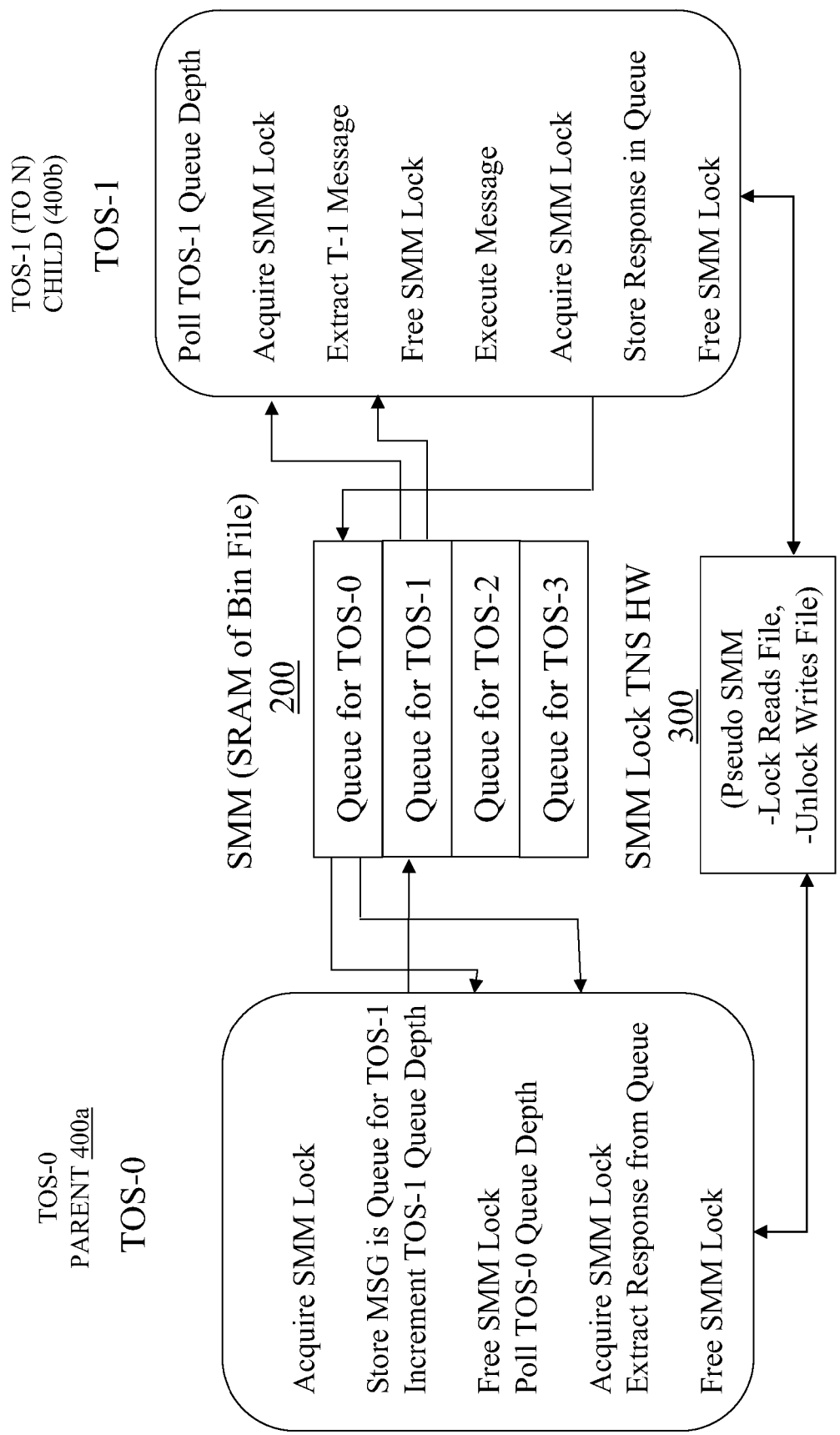
FIG. 2 shows an illustrative example of the invention, which may equally be representative of a flow diagram showing steps of the invention.

FIG. 2 shows an illustrative example of the invention, which may equally be representative of a flow diagram showing steps of the invention. In FIG. 2, an example of two program applications, e.g., TOS-0 400a and TOS-1 400b, are shown communicating with one another using the SMM 200 and SMM Lock TNS HW 300 in accordance with the invention. It should be understood by those of ordinary skill in the art that more than more than two TOS applications (or other known verification applications) may be implemented with the present invention, in the manner described herein.

In one specific embodiment, the SMM Lock TNS HW 300 implements a handshake, which provides a coherent structure for the SMM to support the inter-TOS protocols. For example, the handshake provides a protocol advising that the TOS-0 400a can communicate with the TOS-1 400b, while locking and unlocking read and write operations.

In the implementation of FIG. 2, the SMM 200 provides a queue for TOS information to be shared between the TOS applications 400a, 400b. The queue can be queried in accordance with the invention.

In the example of FIG. 2, the TOS-0 400a acquires a lock to the SMM 200 and the information obtained in the TOS-0 test case or portion thereof is transferred and stored in the queue of the SMM 200. The SMM lock will be freed and the TOS-0 400a will poll the queue depth of the SMM 200. The handshake will then signal to the TOS-1 400b to implement its test case program (which may be running on different processors), which can now be implemented with the information obtained from the TOS-0 application run. The TOS-1 400b will poll the queue depth and acquire a lock. The TOS-1 400b will extract a message, free the SMM lock and execute the message. The message will include information which is used with the execution of the test case run on TOS-1.

As further steps, the TOS-0 400a may acquire the lock and extract the response from the queue and free the lock, which permits the TOS-1 to acquire the lock (e.g., under direction from the handshake). The TOS-1 400b may store the response in a queue for reference when executing its program application. The lock of the SMM may then be freed. In this manner, the test cases of the TOS-0 and TOS-1 can run simultaneously (e.g., be distributed) and can communicate their respective state in order to validate or verify a multiprocessor (MP) program.

Using the example of FIG. 2, a mechanism for each TOS application to poll command queue during parallel test case schedules can be implemented during slow and fast mode operations. For example, in implementation, Fast mode: debugging a test case; and
Slow mode: running multiple test cases to verify the largest amount of test cases for verification on one simulation run.

Figure 3:
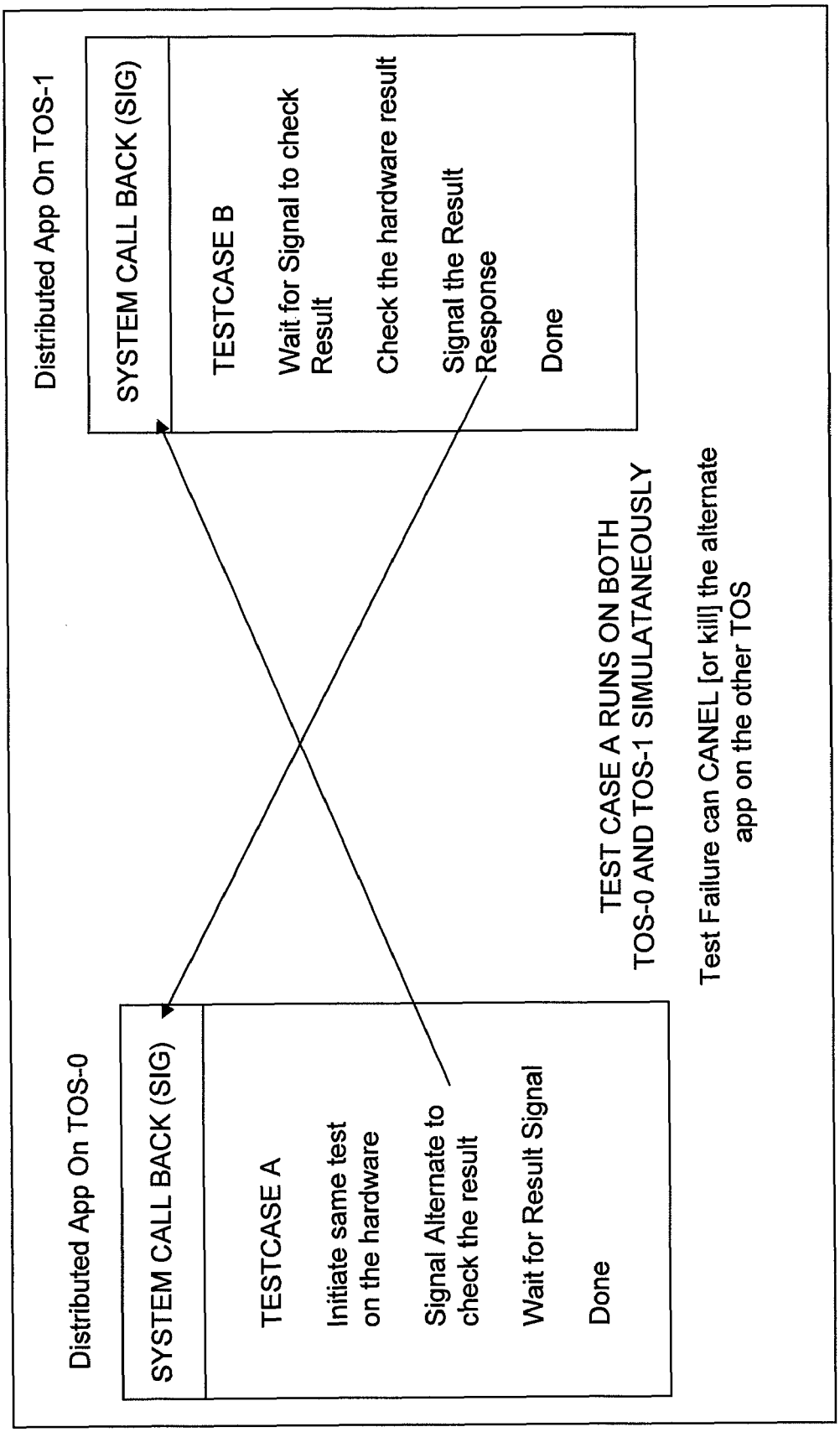
FIG. 3 is a block diagram representative of failure recovery mechanism, which may equally be representative of a flow diagram showing steps of the invention.

FIG. 3 is a block diagram representative of a failure recovery mechanism, which may equally be representative of a flow diagram showing steps of the invention. The failure recovery mechanism may be resident on the one or more workstations 100 and is designed to cancel a test case being run on a TOS application during a simulation run. For example, in the example of FIG. 3, a distributed application on TOS-0 and/or TOS-1 may be canceled using the failure recovery mechanism of the invention.

In implementations, the failure recovery mechanism provides signals between the TOS applications running different test cases of the distributed test case. By way of example, TOS-0 may initiate a test on hardware, which runs simultaneously on TOS-0 and TOS-1 in accordance with the invention. TOS-0 will signal the alternate TOS, TOS-1, to check the result of the test being run. TOS-1, on the other hand, will wait for the signal to check the result. TOS-1 will check the hardware result and signal back the response to TOS-0. TOS-0 will wait for the result, and if the result is not provided in a predetermined time period, TOS-1 will provide a signal to cancel the alternate test case being run on TOS-1. This "cancel" or "kill" operation may be implemented by MP TOS using, for example, the MPTOS_CAN_ALTERNATE API.

Figure 4:
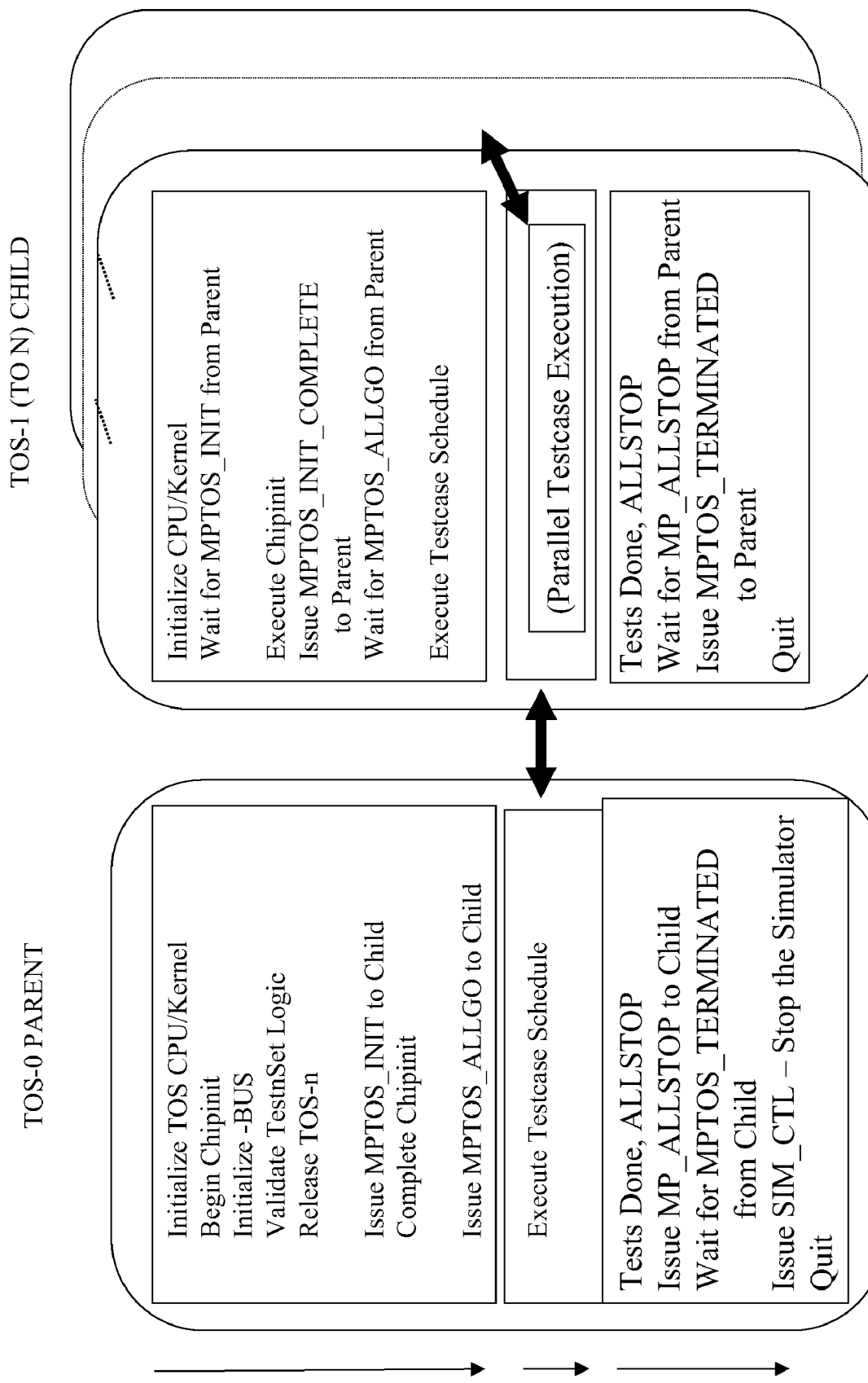
FIG. 4 is a block diagram representative of an illustrative example implementing the system and method of the invention.

FIG. 4 shows an embodiment implementing the system and method of the invention. In FIG. 4, the following steps may be performed prior to running the test case and failure recovery, for example, as shown in the illustrative examples of FIG. 2 and FIG. 3:

Initialize TOS CPU/Kernel;
Begin Chip initialization;
Initialize —BUS;
Validate TestnSet Logic;
Release TOS-n;
Issue MPTOS_INIT to Child (if TOS-0);
Complete Chip initialization; and
Issue MPTOS_ALLGO to Child As should be understood, these steps may be synchronized with that of the TOS-1 application by use of the handshake protocol.

In FIG. 4, the TOS-1 (Child) performs the following steps prior to running the test case and failure recovery as shown, for example, in the illustrative examples of FIG. 2 and FIG. 3:

Initialize CPU/Kernel;
Wait for MPTOS_INIT from Parent;
Execute Chip initialization;
Issue MPTOS_INIT_COMPLETE to Parent;
Wait for MPTOS_ALLGO from Parent; and
Execute Test case Schedule.

As should be understood, these steps may be synchronized with that of the TOS-0 application by use of the handshake protocol.

Still referring to FIG. 4, upon initialization of the TOS-0, TOS-1, the test case can then be run simultaneously, in accordance with the above description. The failure recovery mechanism may also be run, as noted above. In one example, the failure recovery may include the following pseudocode implemented on TOS-0, communicating to a child (or children) executing a test case:

Tests Done, ALLSTOP;
Issue MP_ALLSTOP to Child;
Wait for MPTOS_TERMINATED from Child;
Issue SIM_CTL—Stop the Simulator; and
Quit.

In this example, the failure recovery may include the following pseudocode implemented on TOS-1 (any child), communicating with TOS-0:

Tests Done, ALLSTOP;
Wait for MP_ALLSTOP from Parent;
Issue MPTOS_TERMINATED to Parent;
Quit.

In the manner described, the system and method of the invention controls and synchronizes distributed test cases (e.g., across multiple abstraction layers) in a multi-processor TOS application for multiple process verification by using the inter-processor message protocol and a handshake protocol. Thus, by implementing the system and method of the invention, tasks within one TOS (or other) application can communicate synchronously and asynchronously across coding layers (using function calls and callback functions) when sharing same HW resources (using MUTEX structures and memory allocations). With this, it is possible to provide inter-task communication between multiple TOS verification applications running simultaneously in a multiprocessor SoC design to be verified, while ensuring coherency.

The method as described herein is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the invention has been described in terms of exemplary embodiments, those skilled in the art will recognize that the invention can be practiced with modifications and in the spirit and scope of the appended claims.

What is claimed is:

1. A method comprising:
   creating a test case that is dependent upon known sequences;
   executing the test case on an originating processor until it reaches a known point;
   executing the test case on a different processor to perform an action;
   informing the originating processor that the action was taken;
   verifying with the originating processor that the action occurred;
   providing a shared message memory (SMM) for the exchange of information obtained during the execution of the test case between the originating processor and the different processor;
   providing a coherent structure for the SMM to support inter-TOS (test operating system) protocols running on the originating processor and the different processor; and
   providing a semaphore mechanism communicating TOS executables during atomic operations on the test case which is shared between the originating processor and the different processor,
   wherein the originating processor and the different processor are physical processors.

2. The method of claim 1, further comprising providing a mechanism for the originating processor and the different processor to poll a command queue during parallel schedules during at least one of slow and fast mode operation.

3. The method of claim 1, further comprising providing a failure recovery mechanism.

4. The method of claim 3, wherein the failure recovery mechanism cancels the test case being run on one of the originating processor and the different processor during a simulation run.

5. The method of claim 4, wherein the failure recovery mechanism comprises: signaling the different processor to check a result of a test case being run; waiting for a return signal with a result of the test case being run; and canceling the test case being run on the different processor when the signal is not returned within a predetermined time period.

6. The method of claim 1, wherein the SMM comprises an SRAM of bin files.

7. The method of claim 6, wherein the providing the coherent structure for the SMM to support inter-TOS (test operating system) protocols comprises utilizing a handshake implemented by a shared message memory lock test and set hardware (SMM Lock TNS HW).

8. The method of claim 7, wherein the handshake causes a first TOS application to check for a result in an alternate TOS application and respond with a result of the check.

9. The method of claim 8, wherein, when a lock is set from one processor, all other processors see and properly identify the lock via the SMM Lock TNS HW.

10. A method comprising:
    providing a signal to access and obtain shared information obtained from an execution of a distributed test case on a first processor of at least two processors such that tasks completed by the first processor are communicated to a second processor of the at least two processors during simultaneous execution of a distributed test case;
    executing a test case of the distributed test case on the second processor using the shared information, upon receipt of the signal, to verify a design; and
    providing a semaphore mechanism communicating TOS executables during atomic operations on the test case which is shared between the first processor and the second processor,
    wherein the signal provides control and synchronization of the distributed test case in a multi-processor application,
    the signal provides a coherent structure for a shared memory to support inter-TOS protocols between the at least two processors, and
    the first processor and the second processor comprise: (i) first and second chips, or (ii) first and second cores of a single chip.

11. The method of claim 10, wherein the at least two processors include program applications which run test cases of the distributed test case synchronously for verification of the design.

12. The method of claim 10, wherein the distributed test case runs on the at least two processors simultaneously.

13. The method of claim 10, further comprising providing a handshake protocol to signal the at least two processors to poll a queue in a shared memory to obtain the shared information.

14. The method of claim 10, further comprising polling a queue depth and acquiring a lock to extract the shared information and execute the distributed test case.

15. The method of claim 10, further comprising providing a failure recovery mechanism comprising: signaling the second processor to check a result of the distributed test case; waiting for a response to the signaling; and canceling the distributed test case being run on the second processor when the waiting for a response to the signaling is longer than a predetermined time.

16. A method comprising:
creating a test case that is dependent upon known sequences;
executing the test case on an originating processor until it reaches a known point;
executing the test case on a different processor to perform an action;
informing the originating processor that the action was taken;
verifying with the originating processor that the action occurred,
providing a shared message memory (SMM) for the exchange of information obtained during the execution of the test case between the originating processor and the different processor;
providing a coherent structure for the SMM to support inter-TOS (test operating system) protocols running on the originating processor and the different processor;
initializing a first TOS application of the originating processor; and
initializing a second TOS application of the different processor,
wherein the originating processor and the different processor are physical processors, and
the test case is executed simultaneously on the originating processor and the different processor by the first TOS application and the second TOS application running the test case.

17. A method comprising:
providing a signal to access and obtain shared information obtained from an execution of a distributed test case on a first processor of at least two processors such that tasks completed by the first processor are communicated to a second processor of the at least two processors during simultaneous execution of a distributed test case;
executing a test case of the distributed test case on the second processor using the shared information, upon receipt of the signal, to verify a design;
initializing a first TOS application of the first processor; and
initializing a second TOS application of the second processor,
wherein the signal provides control and synchronization of the distributed test case in a multi-processor application,
the signal provides a coherent structure for a shared memory to support inter-TOS protocols between the at least two processors,
the first processor and the second processor comprise: (i) first and second chips, or (ii) first and second cores of a single chip, and
the test case is executed simultaneously on the first processor and the second processor by the first TOS application and the second TOS application running the test case.

18. A method comprising:
creating a test case that is dependent upon known sequences;
executing the test case on an originating processor until it reaches a known point;
executing the test case on a different processor to perform an action;
informing the originating processor that the action was taken;
verifying with the originating processor that the action occurred; and
providing a semaphore mechanism communicating TOS executables during atomic operations on the test case which is shared between the originating processor and the different processor,
wherein the originating processor and the different processor are physical processors.

19. A method comprising:
providing a signal to access and obtain shared information obtained from an execution of a distributed test case on a first processor of at least two processors such that tasks completed by the first processor are communicated to a second processor of the at least two processors during simultaneous execution of a distributed test case;
executing a test case of the distributed test case on the second processor using the shared information, upon receipt of the signal, to verify a design; and
providing a semaphore mechanism communicating TOS executables during atomic operations on the test case which is shared between the first processor and the second processor,
wherein the signal provides control and synchronization of the distributed test case in a multi-processor application; and
the first processor and the second processor comprise: (i) first and second chips, or (ii) first and second cores of a single chip.

* * * * *